United States Patent
Lai

(10) Patent No.: US 8,998,470 B2
(45) Date of Patent: Apr. 7, 2015

(54) ELECTRONIC CENSER WITH DETACHABLE INCENSE

(71) Applicant: Hon Hai Precision Industry Co., Ltd., New Taipei (TW)

(72) Inventor: Chih-Chen Lai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/968,412

(22) Filed: Aug. 15, 2013

(65) Prior Publication Data
US 2014/0177264 A1 Jun. 26, 2014

(30) Foreign Application Priority Data
Dec. 21, 2012 (CN) .......................... 2012 1 0561326

(51) Int. Cl.
| | |
|---|---|
| F21K 99/00 | (2010.01) |
| A61L 9/03 | (2006.01) |
| H01R 33/00 | (2006.01) |
| F21L 4/00 | (2006.01) |
| F21V 33/00 | (2006.01) |

(52) U.S. Cl.
CPC .............. *F21L 4/00* (2013.01); *F21V 33/0024* (2013.01)

(58) Field of Classification Search
USPC .......................... 422/126, 120; 362/641, 101
See application file for complete search history.

(56) References Cited

U.S. PATENT DOCUMENTS

| | | | |
|---|---|---|---|
| 8,298,489 B1 * | 10/2012 | Chen | 422/126 |
| 8,815,164 B1 * | 8/2014 | Al Azemi | 422/125 |
| 2013/0115140 A1 * | 5/2013 | Lai et al. | 422/126 |

FOREIGN PATENT DOCUMENTS

CN 201888671 U * 7/2011

* cited by examiner

*Primary Examiner* — Joseph L Williams
(74) *Attorney, Agent, or Firm* — Novak Druce Connolly Bov + Quigg LLP

(57) ABSTRACT

An electronic censer includes a seat and an incense detachably mounted on the seat. The seat includes a base, a supporting plate mounted on the base, two pins protruding from the plate and an annular rib surrounding the pins. A bottom of the incense is inserted within the annular rib. The incense includes a light guiding rod, a shell enclosing the rod, an LED, a circuit board and a battery embedded within the shell. An induction coil is fixed in the shell to control the lighting of the LED.

20 Claims, 1 Drawing Sheet

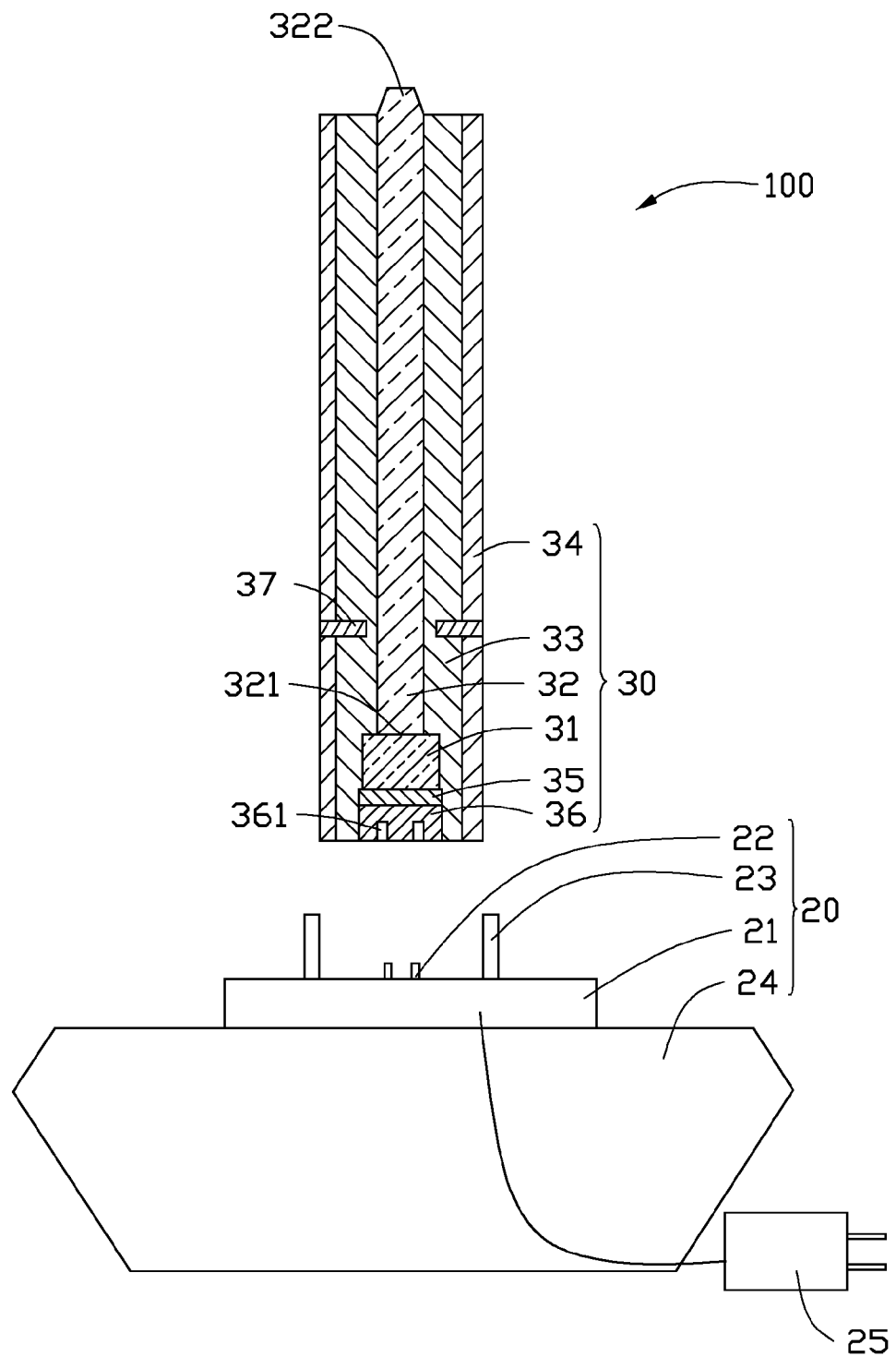

ELECTRONIC CENSER WITH DETACHABLE INCENSE

BACKGROUND

1. Technical Field

The disclosure generally relates to an electronic device, and particularly to an electronic censer with a detachable incense which uses an LED as a light source.

2. Description of Related Art

Traditional censers include seats and incenses inserted to the seats. A typical incense includes a bamboo core and aromatic biotic materials coated on the core. When burned, the aromatic biotic materials release large amounts of smoke. The burning incenses may ignite surrounding articles to fire; furthermore, the released smoke not only pollutes the environment, but also is harmful to health.

Generally, electronic censers are used to replace the traditional censers. An electronic censer includes a seat and an electronic incense inserted in the seat. The electronic incense is made of light guiding material in the form of a rod. The seat includes a light source which is an LED. However, the incense should be fixed to the seat to generate the effectiveness of the burning incense. The incense cannot be used separately from the seat meanwhile still have the burning effectiveness to do the worship which is the general practice for Buddhism and Taoism. Therefore, the use of the conventional electronic censer to replace the traditional censer is not totally satisfied.

What is needed, therefore, is an electronic censer with a detachable incense which can overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

The only drawing FIGURE shows an electronic censer in accordance with an embodiment of the present disclosure.

DETAILED DESCRIPTION

Referring to the only drawing FIGURE, an electronic censer 100 in accordance with an embodiment of the disclosure is shown. The electronic censer 100 includes a seat 20 and an incense 30 detachably mounted on the seat 20.

The seat 20 includes a base 24 and a socket mounted on the base 24. The socket includes a supporting plate 21, two pins 22 formed on the supporting plate 21 and a retaining rib 23 fixed on the supporting plate 21. The supporting plate 21 has an area less than that of the base 24. The two pins 22 are located at a central area of the supporting plate 21. The two pins 22 protrude upwardly from a top face of the supporting plate 21. The two pins 22 are used to electrically connect the incense 30 for supplying power to the incense 30. A plug 25 is electrically to the two pins 22 via the supporting plate 21. The plug 25 can be inserted to a general power socket for introducing the power to the seat 20. The retaining rib 23 is annular and surrounds the two pins 22. The retaining rib 23 has a height larger than that of the pin 22. An inner diameter of the retaining rib 23 is slightly larger or equal to an outer diameter of the incense 30. The incense 30 can be inserted within the rib 23 to be held on the seat 20.

The incense 30 includes a light guiding rod 32, a shell 33 enclosing the rod 32 and an LED (light emitting diode) 31, a circuit board 35 and a battery 36 received in the shell 33. The battery 36 is a rechargeable battery. The rod 32 is made of transparent material such as epoxy, glass or the like. The rod 32 is elongated and straight. A bottom face 321 of the rod 32 contacts a light emergent face of the LED 31 for introducing light emitted from the LED 31 to an interior of the rod 32. The rod 32 is mostly received in the shell 33 except a top end thereof. The top end of the rod 32 forms a light emission tip 322 protruding out of the shell 33. The light emission tip 322 has a flat top face and a conical circumferential face connecting the top face. The circumferential face of the light emission tip 322 has a diameter gradually increasing from the top face of the light emission tip 322 towards the bottom face 321 of the rod 32. The top face and the circumferential face of the light emission tip 322 form a large amount of micro grooves or protrusions thereon. Thus, the top face and the circumferential face of the light emission tip 322 become rough for uniformly diffusing the light to an outside environment.

The circuit board 35 and the LED 31 are sequentially stacked on the battery 36. The LED 31 may be a red LED 31 which emits red light when activated, thereby imitating burning of a typical real incense. The battery 36 is fixed in a bottom of the shell 33. The battery 36 has a bottom face exposed downwardly. Two slots 361 are defined in the bottom face of the battery 36. The two pins 22 can be respectively inserted to the two slots 361 when the incense 30 is mounted on the seat 20, whereby the battery 36 is charged by the seat 20. The battery 36 can supply power for the LED 31 when the incense 30 is detached from the seat 20. The circuit board 35 electrically connects the battery 36 with the LED 31.

The shell 33 incorporates the rod 32, the LED 31, the circuit board 35 and the battery 36 therein. The shell 33 may be made of plastic, rubber or other suitable materials. The shell 33 may form a light reflective film (not visible) on an inner circumferential face thereof. Thus, light can be confined by the light reflective film to transmit within the rod 32. The shell 33 has a bottom face flush with the bottom face of the battery 36, and a top face lower than the top face of the light emission tip 322.

A coating layer 34 is formed on an outer circumferential face of the shell 33. The coating layer 34 may have a color similar to the typical real incense in order to imitate the appearance of the typical real incense. The coating layer 34 has a thickness less than that of the shell 33.

An induction coil 37 is fixed in the shell 33. The induction coil 37 has an inner diameter larger than a diameter of the rod 32, and an outer diameter equal to that of the coating layer 34. In other words, the induction coil 37 surrounds the rod 32 and is wholly embedded within the coating layer 34. The induction coil 37 is located at a lower portion of the incense 30 adjacent to the LED 31. The induction coil 37 is electrically connected to the circuit board 35. When the incense 30 is detached from the seat 20, the induction coil 37 acts as a switch to control the LED 31. In detail, when the induction coil 37 detects static electricity (such as a person grasps the incense 30 with fingers contacting the induction coil 37), a signal will be sent to the circuit board 35 which then controls the LED 31 to lighten for a predetermined period. However, if the person grasps the incense 30 without contacting the induction coil 37, the LED 31 will be kept off since no static electricity is detected by the induction coil 37.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic censer comprising:
   a seat comprising:
      a supporting plate;
      an annular retaining rib formed on the supporting plate; and
      two pins protruding upwardly from the supporting plate, the two pins being surrounded by the retaining rib; and
   an incense surrounded by the retaining rib and detachably mounted on the seat, a bottom of the incense engagable with the retaining rib, the incense comprising:
      a shell;
      a light guiding rod received in the shell;
      a light emitting diode facing the light guiding rod, light emitted from the light emitting diode passing through the light guiding rod to an outside environment of the electronic censer; and
      a rechargeable battery received in the shell for supplying power to the light emitting diode.

2. The electronic censer of claim 1, wherein the rechargeable battery has a bottom face exposed at the bottom of the incense, the rechargeable battery defining two slots in the bottom face thereof to receive the two pins, respectively.

3. The electronic censer of claim 2, wherein the seat charges the rechargeable battery through the pins.

4. The electronic censer of claim 1, wherein the light guiding rod comprises a light emission tip protruding beyond a top of the shell, the light emission tip diffusing the light to the outside environment of the electronic censer.

5. The electronic censer of claim 4, wherein the light emission tip comprises a flat top face and a conical circumferential face connecting the flat top face, the flat top face and the conical circumferential face being rough.

6. The electronic censer of claim 1, wherein the incense further comprises an induction coil fixed to the shell, the induction coil controlling operation of the light emitting diode.

7. The electronic censer of claim 6, wherein the induction coil is embedded within the shell.

8. The electronic censer of claim 6, wherein the induction coil is located at a lower portion of the incense adjacent to the LED.

9. The electronic censer of claim 6, wherein the induction coil drives the light emitting diode to lighten when the induction coil detects static electricity.

10. The electronic censer of claim 6, wherein the incense further comprises a coating layer formed on an outer circumferential face of the shell.

11. The electronic censer of claim 10, wherein the induction coil has an inner diameter larger than a diameter of the light guiding rod, and an outer diameter equal to an outer diameter of the coating layer.

12. The electronic censer of claim 10, wherein the coating layer has a thickness less than that of the shell.

13. The electronic censer of claim 6, wherein the incense further comprises a circuit board electrically connecting the light emitting diode with the rechargeable battery.

14. The electronic censer of claim 13, wherein the circuit board is sandwiched between the light emitting diode and the rechargeable battery.

15. The electronic censer of claim 13, wherein the induction coil is electrically connected to the circuit board.

16. An electronic censer comprising:
    a seat;
    an incense detachably mounted on the seat, the incense comprising:
       a shell;
       a light guiding rod received in the shell;
       a light emitting diode facing the light guiding rod, light emitted from the light emitting diode passing through the light guiding rod to an outside environment of the electronic censer; and
       a rechargeable battery received in the shell for supplying power to the light emitting diode;
       wherein the incense further comprises an induction coil fixed to the shell, the induction coil controlling operation of the light emitting diode.

17. The electronic censer of claim 16, wherein the induction coil is embedded within the shell.

18. The electronic censer of claim 16, wherein the induction coil is located at a lower portion of the incense adjacent to the LED.

19. The electronic censer of claim 16, wherein the induction coil drives the light emitting diode to lighten when the induction coil detects static electricity.

20. The electronic censer of claim 16, wherein the incense further comprises a coating layer formed on an outer circumferential face of the shell.

* * * * *